UNITED STATES PATENT OFFICE.

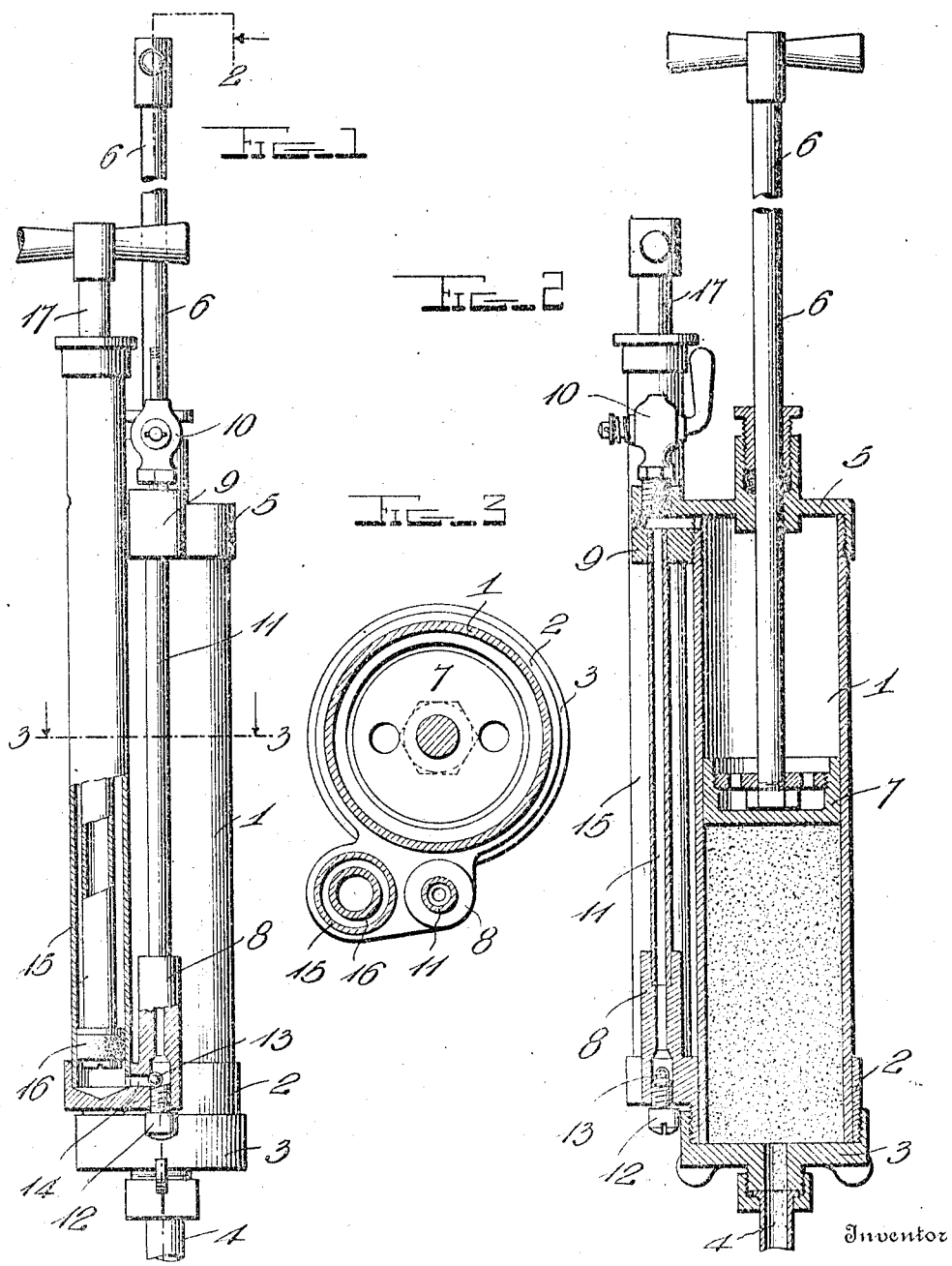

HENRY HERBERT COLSON, OF EVERETT, MASSACHUSETTS.

GREASE-GUN.

1,040,513.  Specification of Letters Patent.  Patented Oct. 8, 1912.

Application filed October 31, 1911. Serial No. 657,822.

*To all whom it may concern:*

Be it known that I, HENRY HERBERT COLSON, citizen of the United States, residing at Everett, in the county of Middlesex and State of Massachusetts, have invented certain new and useful Improvements in Grease-Guns, of which the following is a specification.

This invention relates to grease guns, and has for its object to provide a simplified structure of such guns, whereby the wear incident to compressing the grease to force the same out of the gun is reduced to a minimum. At the same time the parts are so arranged that an operative may ascertain and know at a glance approximately how much grease or lubricant remains in the gun after a certain amount of the lubricant has been discharged therefrom.

With this object in view the invention consists in providing in combination with a gun consisting of a cylinder having a discharge end and a piston slidably mounted therein, together with a handle attached to the piston and slidably mounted in that end of the cylinder opposite its discharge end with means for compressing air and forcing the same into the cylinder between one end thereof and the piston, whereby the piston is moved against the grease and the grease is forced out of the gun.

A further object of the invention is to provide a structure in which the parts are compactly and substantially assembled and with this object in view the cylinder is provided at its ends with castings of peculiar design which support the air pump and its attachments so that when the air pump is operated there will be no side strain calculated to force or spring the air pump out of its proper position with relation to the cylinder.

For a full understanding of the invention reference is to be had to the following description and accompanying drawings, in which:

Figure 1 is a view of the elevation, partly in section of the improved grease cup. Fig. 2 is a vertical section view taken on the line 2—2 of Fig. 1. Fig. 3 is a transverse section view taken on the line 3—3 of Fig. 1.

Corresponding and like parts are referred to in the following description and indicated in all the views of the accompanying drawings by the same reference characters.

The grease gun includes a cylinder 1 upon the lower end of which is mounted a band 2. A head 3 is screw threaded upon the band 2 and closes one end of the cylinder 1. The head 3 is designed to be connected with an oil pipe 4 in any appropriate manner. A head 5 is screw threaded upon the opposite end of the cylinder 1 which is closed by the head 3. A stem 6 passes through the head 5 and is attached at its inner end to the piston 7 which is of any approved pattern and which is slidably mounted in the cylinder 1. The band 2 is provided at one side with a nipple 8 and the head 5 is provided at the same side with a nipple 9. The nipple 9 communicates with the interior of the chamber 1 through the side of the head 5 and a valve 10 is mounted upon the said nipple 9. A pipe 11 connects the nipples 8 and 9 together. A plug 12 is detachably mounted in the nipple 8 and retains a ball 13 therein which is adapted to serve as a check valve. Any other form of check valve may be employed if desired. The valve 13 is adapted to operate over the inner end of a by-pass 14 with which the nipple 8 is provided. A cylinder 15 communicates at its lower end with the by-pass 14 and at its upper end is supported by the head 5. A piston 16 is slidably mounted in the cylinder 15 and is provided at the upper end of its stem with a handle 17.

In operation, the head 3 is unscrewed from the pipe 4, whereby the grease gun is detached from the said pipe. The head 3 is then unscrewed from the band 2 and the piston 7 is moved down to the lower end of the cylinder 1 which is then in an inverted position. Hard oil or grease is then filled into the cylinder 1. The head 3 is screwed back upon the band 2, then the head 3 is screwed into engagement with the pipe 4, when the cylinder 1 is in its proper position. Then by reciprocating the piston 16 by the use of the handle 17 air is forced down through the cylinder 15, through the by-pass 14 and the valve 13 into the nipple 8. Through the nipple 8 the air passes to the pipe 11 and into the nipple 9 and from the nipple 9 into the upper end of the cylinder 1 above the piston 7 located therein. Thus the said piston is forced down upon the oil or grease and the grease in turn is forced down through the head 3 and the pipe 4 to the parts of a machine to which it is to be led. As soon as the operation of the air pump and piston 16 located therein is interrupted, the valve 13 is forced back against the end of the by-pass 14 by the back pressure and the contents of the cylinder 1 are maintained under pressure.

The stem 6 may be provided with graduations so that as it descends through the head 5 an operative may determine at a glance the amount of grease or lubricant that has been consumed or used.

This grease gun is especially adapted to be used upon automobiles or similar vehicles where space is limited and where it is desirable to have the parts compactly and at the same time substantially assembled.

Having thus described the invention, what is claimed as new is:

1. In a grease gun, the combination of a cylinder having a discharge, a reciprocatory piston disposed in the cylinder and having a stem extending outside the cylinder, whereby the piston may be drawn by hand in a direction away from the discharge, means for introducing fluid under pressure into the cylinder at the opposite side of the piston to the discharge, and a valved conduit communicating at its inner end with the interior of the cylinder at said side of the piston and communicating at its outer end with the atmosphere, whereby when the valve of the conduit is open the piston can be easily drawn in a direction away from the discharge.

2. A grease gun comprising a cylinder, a head closing one end thereof and having a nipple and also having a valved conduit communicating at its inner end with the interior of the cylinder and at its outer end with the atmosphere, a band located at the opposite end of the cylinder and having a nipple provided with a by-pass, a head detachably secured on said band and having a discharge and adapted to be detachably connected to an oil pipe, a reciprocatory piston disposed in said cylinder and having a stem extending in a direction away from said discharge and outside the cylinder, a pipe connecting the nipples together and communicating at its upper end with the interior of the cylinder, a cylinder fixed to the band and to the head at the opposite end of the first-named cylinder, a passage between the lower ends of the second-named cylinder and the pipe, a non-return valve in said passage, and a reciprocatory piston in the second-named cylinder and having a stem extending outside the same.

In testimony whereof I affix my signature in the presence of two witnesses.

HENRY HERBERT COLSON.

Witnesses:
ROBIE L. MITCHELL,
MARY E. BOWDEN.